US009463415B2

(12) United States Patent
Preston (10) Patent No.: US 9,463,415 B2
(45) Date of Patent: Oct. 11, 2016

(54) HYDROGEN RECYCLING APPARATUS AND METHOD OF OPERATION

(71) Applicant: Sustainable Innovations, LLC, East Hartford, CT (US)

(72) Inventor: Joshua S. Preston, Manchester, CT (US)

(73) Assignee: SUSTAINABLE INNOVATIONS, LLC, East Hartford, CT (US)

(*) Notice: Subject to any disclaimer, the term of this patent is extended or adjusted under 35 U.S.C. 154(b) by 183 days.

(21) Appl. No.: 14/279,513

(22) Filed: May 16, 2014

(65) Prior Publication Data

US 2014/0353169 A1    Dec. 4, 2014

Related U.S. Application Data

(60) Provisional application No. 61/829,478, filed on May 31, 2013.

(51) Int. Cl.
| | | |
|---|---|---|
| *C01B 3/00* | (2006.01) | |
| *B01D 53/32* | (2006.01) | |
| *C01B 3/50* | (2006.01) | |
| *C21D 1/74* | (2006.01) | |
| *C01B 3/16* | (2006.01) | |

(52) U.S. Cl.
CPC ............... *B01D 53/326* (2013.01); *C01B 3/16* (2013.01); *C01B 3/50* (2013.01); *C21D 1/74* (2013.01); *B01D 2256/16* (2013.01); *B01D 2257/502* (2013.01); *B01D 2258/02* (2013.01); *Y02E 60/366* (2013.01); *Y02P 10/212* (2015.11)

(58) Field of Classification Search
None
See application file for complete search history.

(56) References Cited

U.S. PATENT DOCUMENTS

| 6,168,705 B1* | 1/2001 | Molter | B01D 53/228 |
| | | | 205/637 |
| 2001/0037948 A1* | 11/2001 | Liu | B01D 53/326 |
| | | | 205/555 |
| 2003/0129462 A1 | 7/2003 | Yang et al. | |
| 2007/0154752 A1 | 7/2007 | McElroy et al. | |
| 2010/0266917 A1 | 10/2010 | Kelley et al. | |
| 2010/0285379 A1 | 11/2010 | Schrieber et al. | |

FOREIGN PATENT DOCUMENTS

JP    2012227008 A    11/2012

OTHER PUBLICATIONS

Notification of Transmittal of the International Search Report for International Application No. PCT/US2014/038882 dated Sep. 23, 2014; Mailed Sep. 24, 2014; 5 pages.
Written Opinion of the International Searching Authority for International Application No. PCT/US2014/038882 dated Sep. 23, 2014; Mailed Sep. 24, 2014; 4 pages.

\* cited by examiner

*Primary Examiner* — Arun S Phasge
(74) *Attorney, Agent, or Firm* — Cantor Colburn LLP (57) ABSTRACT

A method of operating an electrochemical cell stack is provided. The method includes feeding a reactant gas to the cell stack. The flow of the reactant gas is halted to at least one cell in the cell stack. The voltage applied to the at least one cell is increased. The flow of reactant gas to the at least one cell is initiated in response to the voltage increasing above a threshold for a predetermined amount of time.

15 Claims, 6 Drawing Sheets

HYDROGEN RECYCLING APPARATUS AND METHOD OF OPERATION

CROSS REFERENCE TO RELATED APPLICATIONS

The present application is a nonprovisional application of U.S. Provisional Application Ser. No. 61/829,478 filed on May 31, 2013 entitled "Hydrogen Recycling Apparatus and Method of Operation," the contents of which are incorporated herein by reference.

BACKGROUND OF THE INVENTION

The subject matter disclosed herein relates to an electrochemical system for separating hydrogen from contaminants in a gas stream substantially composed of hydrogen, and in particular to a system for separating hydrogen from a mixture containing carbon monoxide ("CO") contaminant.

Polymer electrode membrane ("PEM") systems use an electrochemical process to separate hydrogen from other elements or compounds. One example of PEM system is an electrolysis cell stack that separates water into hydrogen and oxygen gas. Another type of PEM system may be used to separate hydrogen from a gas stream comprised of hydrogen and other compounds such as $CO_2$, CO, $N_2$, etc. These types of PEM systems may be applicable to applications that use hydrogen as a process fluid, such as a heat treating operation where the heat treating is performed in a hydrogen atmosphere.

The PEM system is typically comprised of a plurality of cells arranged electrically in series. Each of the cells consists of a polymer membrane with an anode and a cathode electrode arranged on opposite sides. When the PEM system is used to process the exhaust gas stream in an application such the aforementioned heat treating operation, operation may be stalled when an appreciable concentrations carbon monoxide ("CO") is present in the hydrogen is fed to an electrode in a PEM cell. The hydrogen is adsorbed on the catalyst and effectively stops the operation of the cell. When carbon monoxide ("CO") is fed to the anode of an electrochemical hydrogen pump or compressor, thermodynamics predicts that a fraction of the CO will participate in an equilibrium reaction with water, which is available due to PEM hydration, and form $CO_2$. Typically, in practice, this reaction is very slow and the electrode catalyst is rapidly de-activated by the CO.

Some prior art systems have tried to address this issue by operating at very high temperatures to accelerate the oxidation of CO. This often requires alternative, high temperature membranes. Another approach that is often explored is raising the cell voltage. When the cell voltage is raised, oxidation of CO is driven at the anode by the external power source, consuming water and forming hydrogen ("$H_2$") at the cathode. This approach works to a degree. Typically, the high voltage is applied momentarily in a pulse or wave function of some sort. However, anytime the voltage applied to the cell is elevated, the power consumption is elevated.

Pulsing the voltage to an elevated voltage also creates other problems. As the voltage is driven higher in an electrochemical hydrogen compressor, although oxidation of CO at the anode is promoted, more hydrogen is oxidized. In other words, the pump rate is increased. A portion of the resultant electrical current will go to oxidize hydrogen while another portion will go to oxidization of CO. So if a hydrogen pump or compressor is operating and the voltage is pulsed higher, the presence of the hydrogen on the anode functions almost as a sacrificial material, preventing the oxidation of CO in favor of oxidation of hydrogen.

Accordingly, while existing PEM systems are suitable for their intended purposes, the need for improvement remains, particularly in providing a PEM system where hydrogen is separated from CO at lower power consumption levels and/or lower operational temperatures.

BRIEF DESCRIPTION OF THE INVENTION

According to one aspect of the invention, a method of operating an electrochemical cell stack is provided. The method includes feeding a reactant gas to the cell stack. The flow of the reactant gas is halted to at least one cell in the cell stack. The voltage applied to the at least one cell is increased. The flow of reactant gas to the at least one cell is initiated in response to the voltage increasing above a threshold or the passing of an appropriate period of time. These and other advantages and features will become more apparent from the following description taken in conjunction with the drawings.

According to another aspect of the invention, a system is provided. The system including a source of reactant gas. The reactant gas including hydrogen and carbon monoxide. An electrochemical cell having an anode and a cathode is provided. The anode having a catalyst configured to convert during operation at least a first portion of the reactant gas to carbon dioxide, the cathode having a catalyst configured to convert during operation at least a second portion of the reactant gas to hydrogen gas. A controller is operably coupled to the source of reactant gas, the controller configured to halt the flow of reactant gas to the electrochemical cell and reinitiate the flow of reactant gas in response to the voltage increasing above a threshold for a predetermined amount of time.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Embodiments of the present invention provide advantages in the separation of hydrogen from a gas stream that includes contaminants, such as CO. Embodiments of the invention provide advantages in restoration of catalyst in an electrochemical cell to allow operation of the electrochemical cell at high CO levels. Still further embodiments of the invention provide advantages in allowing the operation of a fuel cell on a gas stream having CO.

Figure 1:
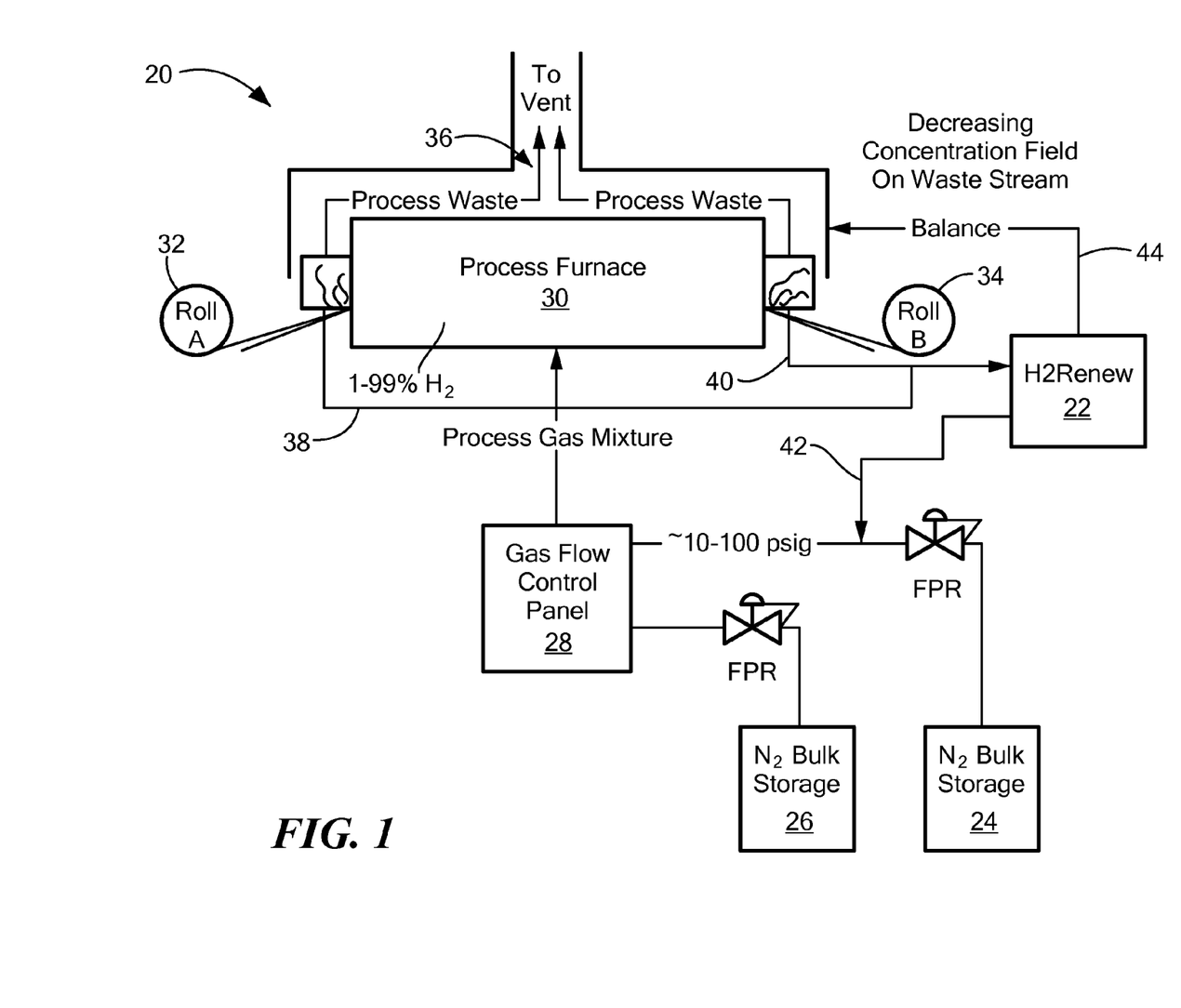
FIG. 1 is a schematic illustration of a heat treating process having a hydrogen recycling apparatus in accordance with an embodiment of the invention.

Referring now to FIG. 1, an exemplary process 20 is shown having an electrochemical hydrogen recycling device 22. The process 20 typically includes a bulk hydrogen storage system 24 and a bulk nitrogen storage system 26. The gas from storage systems 24, 26 are coupled to a manifold on a gas flow control panel 28. The gas flow control panel 28 is configured to flow the desired volume and mixture of gas to a process device, such as furnace 30 for example. Where the process device is a furnace 30, a material to be heat treated is fed from a first roll 32 into the furnace 30 where the material is processed in an atmosphere that is primarily hydrogen. In the exemplary embodiment, the atmosphere within the furnace 30 is approximately 99% hydrogen. The material exits the furnace 30 and is collected on a material roll 34.

A process waste gas 36 exits the furnace 30. In a prior art system, this process waste, which contains about 100 ppm of CO with the remainder being hydrogen is vented to the atmosphere. In the exemplary embodiment, this process waste gas 36 is directed via conduits 38, 40 into the hydrogen recycling apparatus 22. As will be discussed in more detail below, the hydrogen recycling apparatus separates the hydrogen from the CO and flows the separated hydrogen via conduit 42 back to the gas flow control panel 28. The CO, some of which may now be converted to $CO_2$ is transferred via conduit 44 to the gas stream 36 where it is vented to atmosphere.

Figure 2:
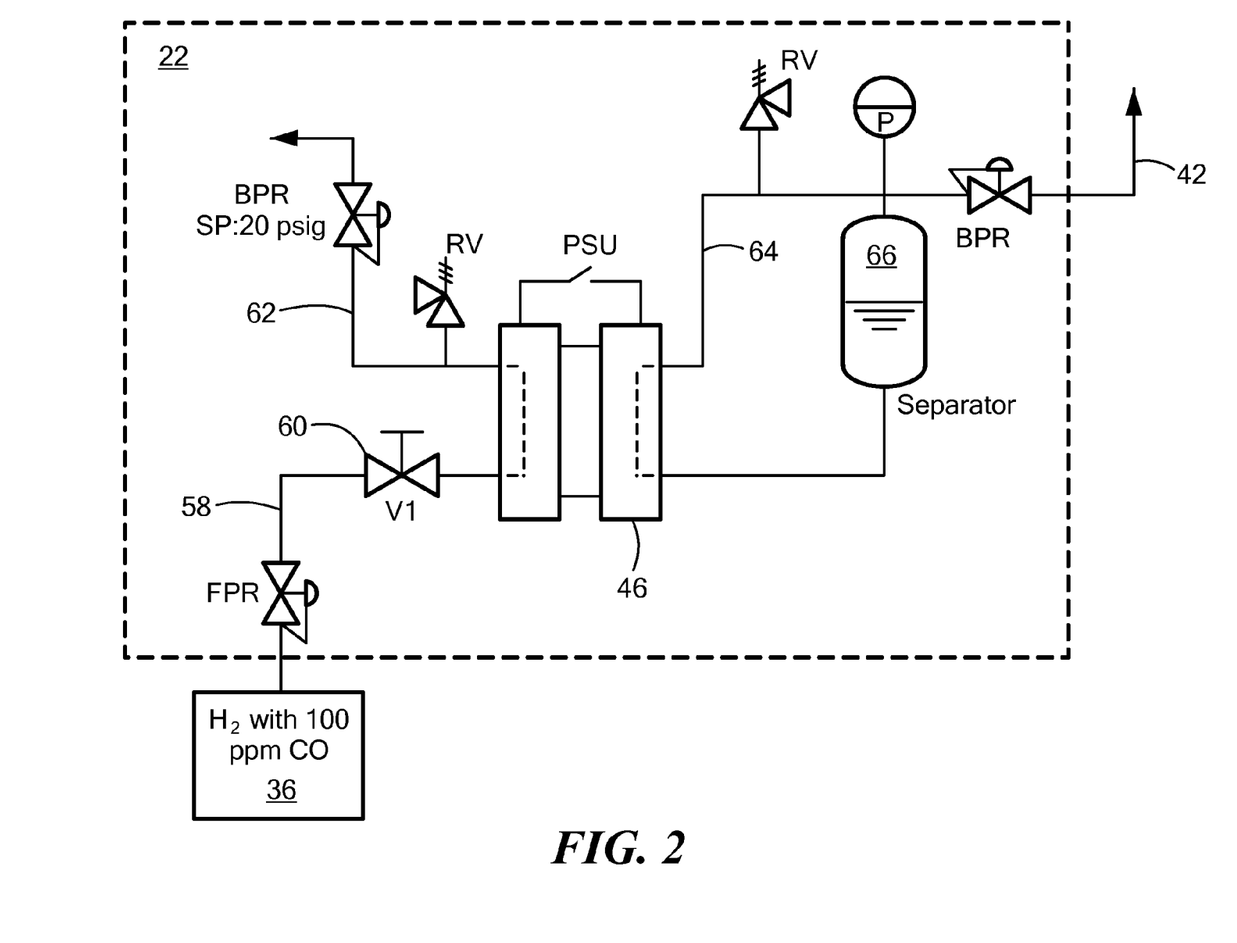
FIG. 2 is a schematic illustration of the hydrogen recycling apparatus of FIG. 1 in accordance with an embodiment of the invention.
Figure 3:
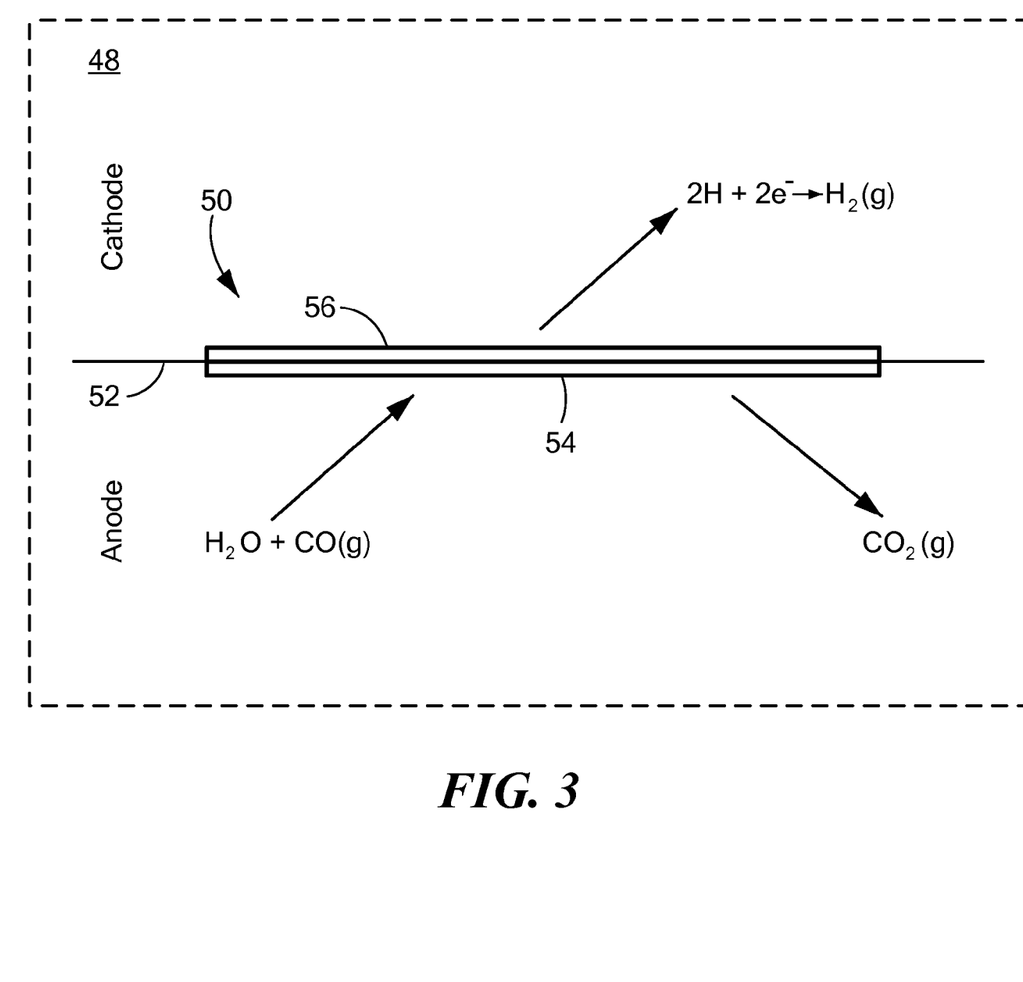
FIG. 3 is a schematic illustration of a reaction within a cell of the hydrogen recycling apparatus of FIG. 2.

Turning now to FIGS. 2-3, the hydrogen recycling apparatus 22 is shown. The apparatus 22 includes an electrochemical cell stack 46. The cell stack 46 is comprised of a plurality of cells 48 arranged in series or in parallel. Each of the cells 48 includes a polymer electrode membrane assembly ("MEA") 50. The electrode membrane assembly 50 includes a proton exchange membrane 52 and electrodes (anode 54 and cathode 56) disposed at opposing sides of proton exchange membrane 52. As shown, both anode 54 and cathode 56 are positioned in ionic communication with the proton exchange membrane 52 within the active areas of the cell. The active areas are defined as being the areas of a cell at which hydrogen is dissociated from a gas stream to produce hydrogen gas on the cathode and $CO_2$ on the anode.

Proton exchange membrane 52 can comprise electrolytes that are preferably solids under the operating conditions of the electrochemical cell. Useful materials from which the membrane 52 can be fabricated include proton conducting ionomers and ion exchange resins. Ion-exchange resins useful as proton conducting materials include hydrocarbon and fluorocarbon-type resins. Fluorocarbon-type resins typically exhibit excellent resistance to oxidation by halogen, strong acids, and bases. One family of fluorocarbon-type resins having sulfonic acid group functionality is NAFION® resins (commercially available from E. I. du Pont de Nemours and Company, Wilmington, Del.).

Anode 54 and cathode 56 are fabricated from catalytic materials suitable for performing the needed electrochemical reaction (e.g., the dissociation of hydrogen gas). Suitable catalytic materials for anode 54 and cathode 56 includes, but is not limited to, platinum, palladium, rhodium, carbon, gold, tantalum, tungsten, ruthenium, iridium, osmium, alloys thereof, and the like, as well as combinations of the foregoing materials. Anode 54 and cathode 56 are positioned adjacent to, and preferably in contact with, their respective proton exchange membrane 52 and are defined by structures comprising discrete catalytic particles adsorbed onto a porous substrate. Adhesion of the catalytic particles onto the substrate may be by any method including, but not limited to, spraying, dipping, painting, imbibing, vapor depositing, combinations of the foregoing methods, and the like. Alternately, the catalytic particles may be deposited directly onto opposing sides of proton exchange membranes 52 or onto the support members.

It should be appreciated that each cell 48 may include further components as is known in the art. These additional components may include gas diffusion layers, flow fields, current collectors and the like.

The process waste gas 36 is routed through conduits 38, 40 into a conduit 58 having a control valve 60. The valve 60 controls the flow of process waste gas 36 to the electrochemical cell stack 46 and hence the flow to cells 48. The electrochemical cell stack 46 includes a first output 62 and a second output 64. The first output 62 is fluidly coupled to the anode side of each cell 48 and connects the electrochemical cell stack 46 to the conduit 44 which vents the balance of the waste gas (e.g. $CO_2$) to the atmosphere. The second output 64 is fluidly coupled to the cathode side of each cell 48 and transfers the separated hydrogen gas to conduit 42 and back to the gas flow control panel 28. It should be appreciated that the apparatus 22 may include additional components, such as phase separator 66 and control valves for example, as is known in the art and a means of maintaining membrane hydration as known in the art.

Figure 4:
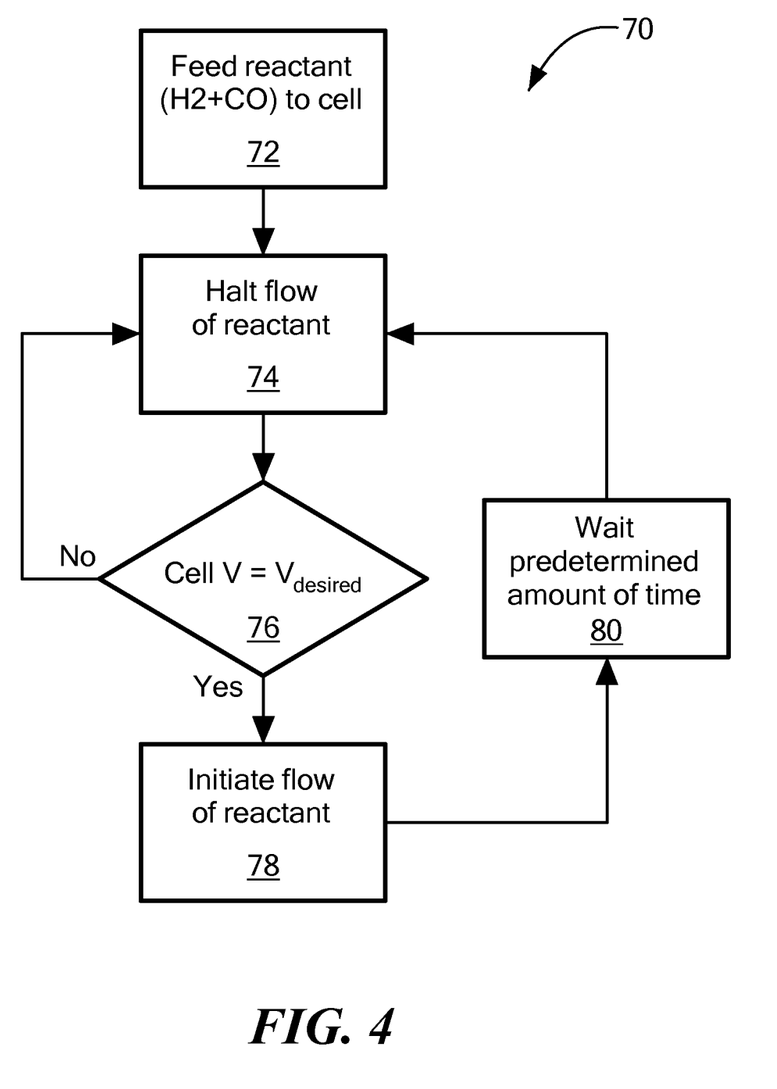
FIG. 4 is a flow diagram of a process for separating hydrogen from contaminants in gas stream.

The transfer or feeding of a gas stream with high levels of CO to an electrochemical cell 46 will rapidly result in a degradation of the electrochemical cell 50 due to de-activation of the catalyst by the CO. Referring now to FIG. 4, a method 70 is shown for restoring catalyst by electro-oxidizing the CO. The process 70 starts in block 72 where the waste gas stream or reactant of $H_2$+CO is fed to the electrochemical cell stack 46. The waste gas stream is processed for a predetermined amount of time and then process 70 proceeds to block 74 where the flow of waste stream gas is halted. When the waste gas stream is halted to the cells 48, the catalyst can be restored by removing the sacrificial hydrogen. When the valve 60 leading the cell anode is closed, the cell 48 will go to the maximum voltage set on the power supply (not shown) coupled to the electrochemical cell stack. Since the electrode is starved of $H_2$ and the applied potential is raised simultaneously, causing the electro-oxidizing the CO on the electrode catalyst. As a result, the catalyst is restored.

Figure 5:
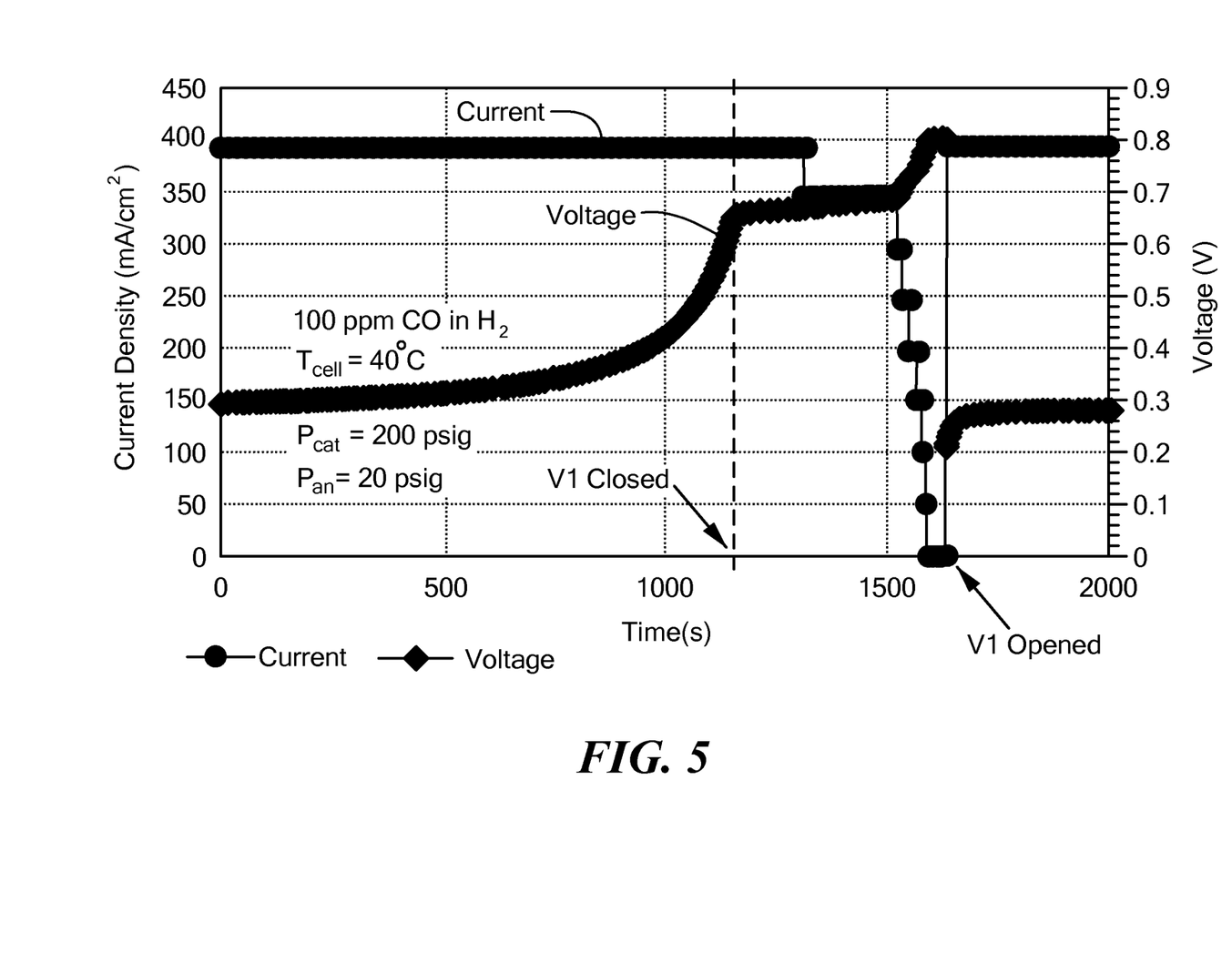
FIG. 5 is a graphical illustration of the current density and voltage within a cell of the hydrogen recycling apparatus of FIG. 2.

To control the amount of time the cells 48 are without the waste gas stream, the process 70 proceeds to query block 76 where it is determined if the cell voltages are equal to a desired voltage (e.g. the maximum voltage set of the power supply). If query block 76 returns a negative, the process 70 loops back to block 74. If query block 76 returns a positive, the process 70 proceeds to block 78 where the flow of process waste gas resumes. The process 70 then proceeds to block 80 where the process waste gas flows to the electrochemical cell stack 46 for a predetermined amount of time. The longer that the valve 60 is closed, the more oxidation occurs. In the exemplary embodiment, the flow of process waste gas is halted approximately every seven minutes. In other embodiments, the voltage limit could be constrained by the applied voltage from the power supply, and the voltage could be left at this high voltage by leaving the valve closed for a longer period of time as shown in FIG. 5, when the valve is closed at time t1, the voltage gradually increases, while the current decreases. It should be appreciated that the process 70 provides advantages in that, since the current is decreasing, the power consumed by the electrochemical cell stack 46 also decreases while the catalyst is restored. When the flow of process waste gas is resumed, the voltage once again returns to its desired operating level.

It should be appreciated that in other embodiments, the amount of time the flow of process waste gas is halted and/or the length of time during which it is allowed to continue may be a function of time only or a combination of time and voltage. It is contemplated that in some embodiments, the voltage and or time may be changed based on operating conditions or parameters.

Figure 6:
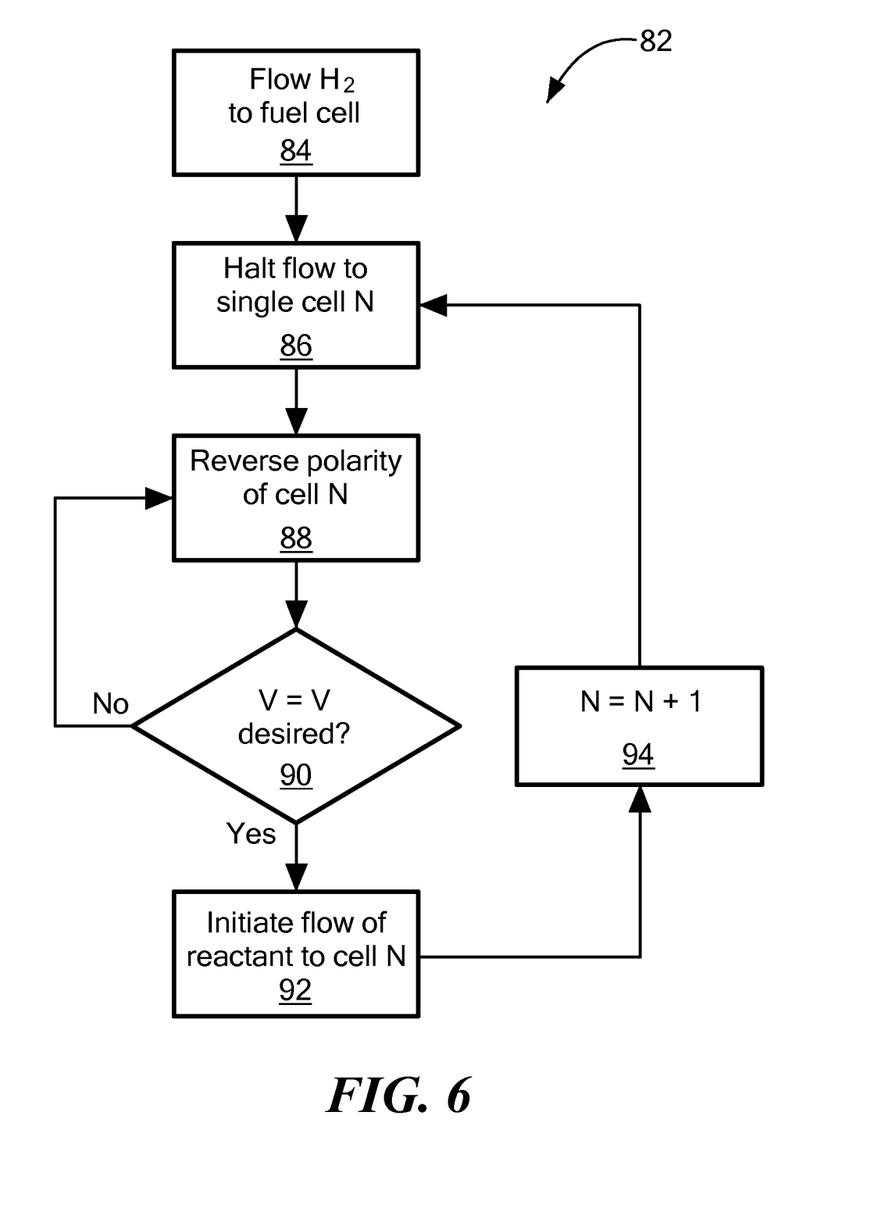
FIG. 6 is a flow diagram of another process for operating a fuel cell.

Referring now to FIG. 6, a method 82 is shown of operating a fuel cell in a manner that drives oxidation at the anode catalyst by inducing a reversal of the polarity of the cell voltage. In this embodiment, it is contemplated that each cell of the fuel cell may include a valve to allow the flow of fuel to be halted on a cell by cell basis. The method 82 starts by flowing the hydrogen containing gas stream in block 84. The method 82 then proceeds after a predetermined amount of time to block 86 where the flow of gas is halted to a single cell. Since the other cells in the fuel cell are still receiving gas, the polarity of the isolated cell is reversed in block 88 driving oxidation at the anode in the isolated cell. The process 82 then proceeds to query block 90 where it is determined if the voltage in the isolated cell is at the desired voltage. In the exemplary embodiment, the desired voltage is the maximum voltage of the cell.

If the query block returns a negative, the process 82 loops back to block 88. If the query block 90 returns a positive, the process 82 proceeds to block 92 where the flow of the gas is reinitiated to the cell. The process 82 then proceeds to block 94 where the cell to be isolated is incremented to the next cell and the process 82 loops back to block 86 where the gas flow to the next cell is halted. The process continues until all of the cells have been isolated and oxidized. After all of the cells in the fuel cell have been oxidized, the fuel cell may operate for a predetermined amount of time, or in one embodiment may cycle back to the first cell that was isolated and the process repeats.

It should be appreciated that the methods described herein may also be used in other electrochemical systems for restoring catalysts that are contaminated with other constituents of a process gas such as hydrocarbons or sulfur for example.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of operating an electrochemical cell stack comprising:
   setting a maximum voltage on a power supply;
   feeding a reactant gas to the cell stack;
   halting the flow of the reactant gas to at least one cell in the cell stack;
   increasing the voltage applied to the at least one cell to the maximum voltage in response to the halting of the flow of reactant gas to the at least one cell; and
   initiating the flow of reactant gas to the at least one cell in response to the voltage increasing above a threshold for a predetermined amount of time.

2. The method of claim 1 wherein the reactant gas includes a mixture of hydrogen and carbon monoxide.

3. The method of claim 2 wherein the cell stack includes an anode and a cathode, the reactant gas being supplied to the anode.

4. The method of claim 3 further comprising generating hydrogen gas at the cathode in response to feeding reactant gas to the cell stack.

5. The method of claim 4 further comprising generating carbon dioxide at the anode in response to feeding reactant gas to the cell stack.

6. The method of claim 1 wherein the cell stack includes a plurality of cells, the plurality of cells including a first cell and a second cell.

7. The method of claim 6 wherein:
   the step of halting the flow of reactant includes halting the flow of reactant to the first cell; and
   the step of increasing the voltage includes reversing the polarity of the first cell.

8. The method of claim 7 further comprising:
   initiating the flow of reactant gas to the first cell;
   halting the flow of the reactant gas to the second cell;
   reversing the polarity of the second cell; and
   initiating the flow of reactant gas to the second cell in response to the voltage being a predetermined voltage.

9. A system comprising:
   a source of reactant gas including hydrogen and carbon monoxide;
   a power supply having a maximum voltage setting;
   an electrochemical cell electrically coupled to the power supply and having an anode and a cathode, the anode having a catalyst configured to convert during operation at least a first portion of the reactant gas to carbon dioxide, the cathode having a catalyst configured to convert during operation at least a second portion of the reactant gas to hydrogen gas; and
   a controller operably coupled to the source of reactant gas, the controller configured to halt the flow of reactant gas to the electrochemical cell, increasing the voltage applied to the electrochemical cell to the maximum voltage setting in response to the halt of the flow of reactant gas, and reinitiating the flow of reactant gas in response to the voltage increasing above a threshold for a predetermined amount of time.

10. The system of claim 9 further comprising a phase separator fluidly coupled to the cathode.

11. The system of claim 10 wherein the source of reactant gas is a process furnace.

12. The system of claim 11 further comprising a vent fluidly coupled to the anode to receive a third portion of said reactant gas and the carbon dioxide.

13. The system of claim 12 further comprising a source of nitrogen gas fluidly coupled to the process furnace and a source of hydrogen gas fluidly coupled to the process furnace.

14. The system of claim 9 wherein the cell stack includes a plurality of cells, each of the plurality of cells having an anode and cathode, the plurality of cells including a first cell and a second cell.

15. The system of claim 14 wherein the controller is further responsive to halting the flow of reactant includes halting the flow of reactant to the first cell and increasing the voltage includes reversing the polarity of the first cell in response to halting the flow of reactant.

* * * * *